(No Model.)
W. W. STALL.
FELLY FOR WHEELS.
No. 509,261. Patented Nov. 21, 1893.
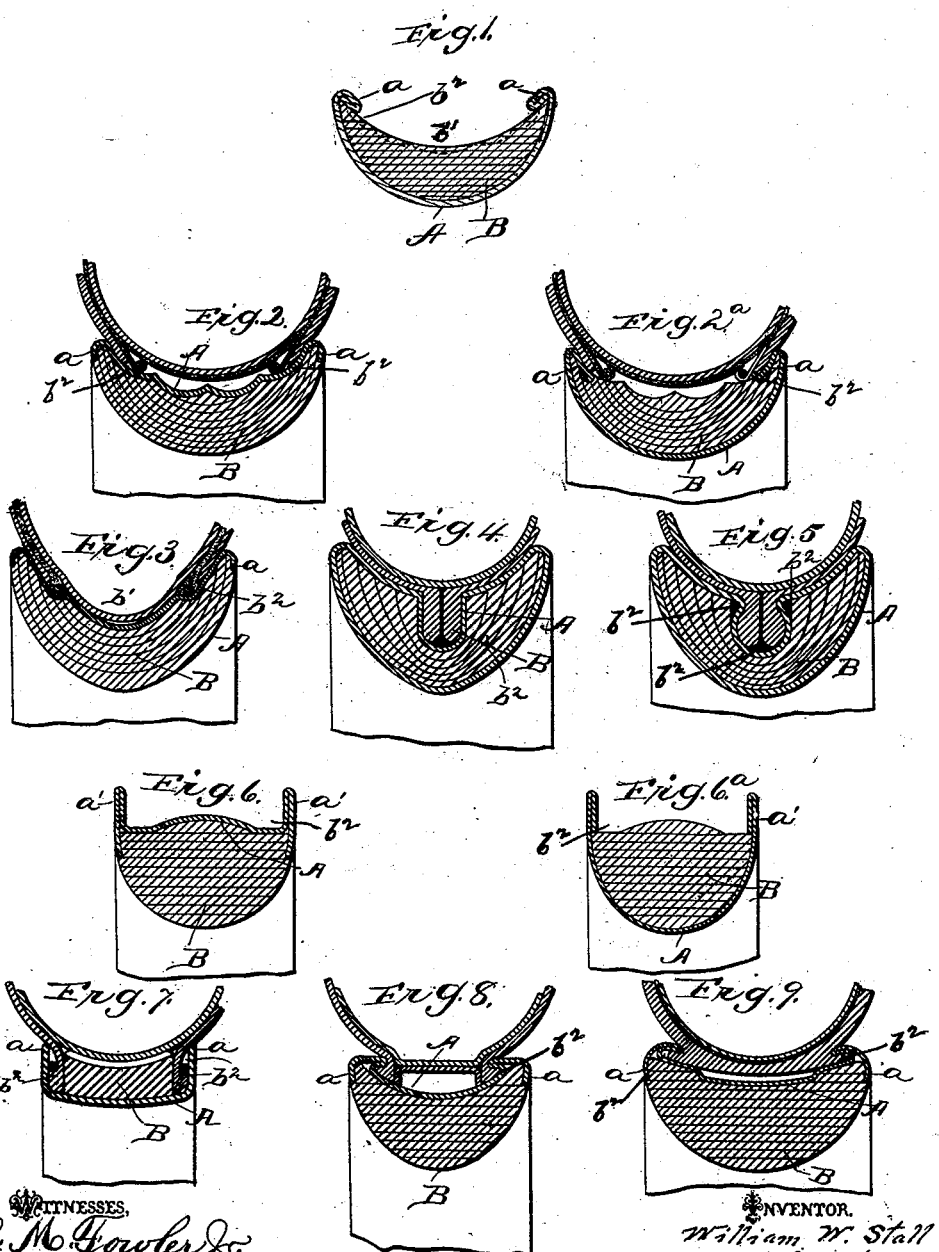

UNITED STATES PATENT OFFICE.

WILLIAM W. STALL, OF BOSTON, MASSACHUSETTS.

FELLY FOR WHEELS.

SPECIFICATION forming part of Letters Patent No. 509,261, dated November 21, 1893.

Application filed June 13, 1893. Serial No. 477,443. (No model.)

*To all whom it may concern:*

Be it known that I, WILLIAM W. STALL, a citizen of the United States, residing at Boston, in the county of Suffolk and State of Massachusetts, have invented certain new and useful Improvements in Rims or Fellies for Wheels; and I do hereby declare the following to be a full, clear, and exact description of the invention, such as will enable others skilled in the art to which it appertains to make and use the same.

This invention relates to the construction of light rims or fellies for bicycles, sulkies, and the like.

Wooden rims, and especially those of the laminated or multiply type, possess many advantages over the metal fellies heretofore used, in the construction of wheels for bicycles, sulkies, &c., where extreme lightness and strength are desired, but it has been found that said light wheel rims are liable to crack or split at the center, or the line of the spoke holes, owing to various causes, and it has also been found difficult to adapt such rims to special makes of pneumatic tires, now commonly used for bicycles and sulkies.

The principle object of this invention is to adapt such rims for use with special makes of pneumatic tires, and a further object of the invention is to prevent cracking or splitting of the rims when subjected to shocks or strains.

With these and minor objects in view, the invention consists in the matters to be hereinafter described, and then pointed out in the claims.

In the accompanying drawings, Figure 1 is a transverse section through a rim embodying my invention. Figs. 2 and 2ª are similar sections of rims adapted for a wired edge tire. Fig. 3, is a similar section through another form of rim adapted for a wired edge tire. Fig. 4, is a similar section through a rim adapted for one form of clincher type tire. Fig. 5 is a similar section through a rim adapted for a slightly modified form of clincher tire. Figs. 6 and 6ª are similar sections through a rim adapted for an arch, or flat bottomed tire. Fig. 7 is a similar section through a rim adapted to another form of wired edge tire. Figs. 8 and 9 are similar sections through rims adapted to other forms of clincher type tires.

In constructing the illustrated, and other special forms of rims, layers or plies of wood may be coiled and secured in any usual or approved manner to form a rim, the rim then being dressed in a suitable molding or routing machine to form the desired peripheral cavity or tire groove, or other desired conformation or configuration. The grooving, dressing, or otherwise shaping of these wooden fellies, and especially of the laminated or multiply felly now in great favor, necessitates in many instances the cutting away of a portion of the outer part of the outer plies of the rim, thus reducing its strength materially, as regards resistance to lateral strains or pressure exerted by or upon the tire, and moreover such rims are liable to crack or split at the center, that is, on the line of the spoke holes owing to the strain of the spokes at that point, or to other causes. To overcome the objections here noted, I provide such rims with a thin metal sheath A, which is rolled, spun, molded or otherwise shaped to snugly embrace or partly embrace said rim, and thereby give lateral support thereto, at the same time serving to form the peripheral channels, grooves or shoulders to engage, and retain within the tire groove, the pneumatic tires usually employed with such rims.

In carrying my invention into practical effect, the tire groove or seat of the rim may be formed wholly or in part by the metal sheath or ribbon, the relative arrangement of the wooden felly and its sheath, and the proportions of said sheath being best determined by the use to which a rim is to be put, or by the shape or characteristic peculiarities of different styles or makes of tires, with which the rims are to be used.

The wooden part B of my improved felly may be made solid, or preferably for strength, as they are quite thin with relation to their breadth of a number of plies or layers of wood coiled one upon another and cemented to form a composite whole.

In Fig. 1, illustrating a rim or felly adapted for the reception of a pneumatic tire, the ordinary crescent shaped form of laminated wooden felly is used, a thin metallic stay or sheath A being rolled, spun, or pressed upon one surface, preferably the inner surface, of said wooden body B, the side edges a of said sheath being turned or bent over the edges b of the wooden body B. The ribbon of metal may be of such width as to in special cases entirely incase or inclose the wooden body B of the rim, or as shown, to have its edges simply overlap the edges b of the wooden body, leaving the bottom of the groove b' bare.

I will state here that while a thin ribbon of steel, or other metal, may be used to form the sheath A, I prefer to employ a ribbon or ring of aluminum or aluminum-alloy because of its lightness, and the ease with which it may be worked, and also for the reason that it possesses other well known qualities that make its use desirable. This sheath A may be applied to either the inner side of the rim, as in Fig. 1, or to the outer or grooved side thereof, as seems most desirable to meet special requirements, though under ordinary conditions of use I prefer to apply said sheath to the inner side of the rim, as in such position it not only gives transverse support to said rim, but gives a desirable finish thereto not readily marred or bruised besides protecting the wooden body B of the rim from moisture at a point which would otherwise be unprotected; the tire, of course, affording ample protection at the outer side of the rim as usual.

In Fig. 1 illustrating rims adapted to what is known as the "Ideal" tire, the usual peripheral tire groove b' is provided with side channels b² to receive the retaining wires secured in the edges of said tire. With this form of rim the sheath A when applied at the inner side thereof is preferably folded at its edges, said folded edges being then bent or pressed inward within the tire groove to form the outer walls of said side channels b² as shown in Fig. 1.

In Fig. 3 is shown a rim adapted to receive what is known as the "New Dunlop" tire, this form of rim being also provided with side channels b² as above described.

The form of ring illustrated in Fig. 4 is shaped to receive a "Telegram" tire, being provided centrally with a single deep channel b² within which the thickened edges of the tire cover are seated. The forming of said central channel at the center of the wooden body B necessarily weakens said body materially, and I therefore contemplate entirely incasing said wooden body B within the sheath A, as shown, should such construction be proved by practical use to be desirable.

The above outlined plan may also be followed in constructing the rim illustrated in Fig. 5, adapted for the reception of a "Swift" tire and the wooden body B shown in Fig. 4 may also be used in constructing the rim shown in Fig. 5, as the necessary overhang of the upper part of the side walls of the central channel may be obtained by properly pressing or shaping the metal of the sheath A.

Figs. 6 and 6ª illustrate a rim designed for use with the "Victor arch" tire, the sheath A being shaped to form side flanges a' to give lateral support to the tire, as well as to provide cementing surface. These side flanges a' may be conveniently formed by folding the edges of the sheath A, as shown, thereby avoiding the expense of forming a peripheral groove in the wooden body B of the rim.

In Fig. 7, illustrating a rim adapted to receive the "Burris-Mechlin" tire, the grooving of the wooden body B may also be avoided as the outer walls of the channels b² which receive the edges of the tire cover may be conveniently formed by the edges a of the sheath A as shown.

Figs. 8 and 9 illustrate rims desired for use with the "Cleveland" and "G. & J." tires. In constructing these rims the wooden body B may be of the same form as shown in Fig. 1, as the overhanging edge flanges of the rim may be well formed by properly shaping the metal sheath A, the edges a of said sheath being, preferably folded, then bent inward to overhang the outer edge of the tire groove b' of the wooden body B, forming in connection therewith channels b² for the reception of beaded edges of the tire cover as shown.

The sheath A may be made in the form of a single ribbon, or of a continuous ring, or in sections of greater or less length, the latter being a preferable construction for the reason that short sections are more easily and therefore more economically handled, and moreover difficulty is experienced in obtaining exact accuracy of fit where continuous rings are used because of slight variations in the size of the wooden rims, and of the metal rings. In some instances I contemplate using a sheath of such short sections that they may be applied between the spokes of the wheel, thus enabling me to sheath a wooden rim that has already been drilled with spoke holes, without the necessity of re-drilling after applying the sheath. Such a sectional construction of sheath is included in the scope of my invention, as the short sections not only give lateral support to the wooden body B of the rim, but may be so shaped and applied to said wooden body as to serve the purpose of forming an overhanging part to engage the wired or beaded edge of a special tire.

Having described my invention, what I claim is—

1. A felly for wheels comprising a wooden body and a metal sheath applied thereto, said sheath being shaped to form a securing channel for the edges of the tire, substantially as described.

2. A felly for wheels comprising a wooden body and a metal sheath embracing said body and shaped to form a securing channel for the edges of a tire, substantially as described.

3. A felly for wheels comprising a wooden body and a metal sheath applied to said body and forming the securing or retaining part of the tire groove therein, substantially as described.

4. A felly for wheels comprising a wooden body and a metal sheath applied to the inner surface of said body and forming in connection therewith annular recesses or channels for securing or retaining the edges of a tire, substantially as described.

5. A felly for wheels comprising a wooden body and a sectional metal sheath embracing said body and giving lateral support thereto, said sheath being formed of a plurality of short sections, substantially as described.

In testimony whereof I affix my signature in presence of two witnesses.

WILLIAM W. STALL.

Witnesses:
H. B. LORD,
H. B. CHAPMAN.